United States Patent
Byford et al.

(10) Patent No.: US 7,496,387 B2
(45) Date of Patent: Feb. 24, 2009

(54) WIRELESS HEADSET FOR USE IN SPEECH RECOGNITION ENVIRONMENT

(75) Inventors: Roger Graham Byford, Apollo, PA (US); Arthur Eugene McNair, Pittsburgh, PA (US); James Randall Logan, Pittsburgh, PA (US); Ryan Anthony Zoschg, Oakmont, PA (US)

(73) Assignee: Vocollect, Inc., Pittsburgh, PA (US)

( * ) Notice: Subject to any disclaimer, the term of this patent is extended or adjusted under 35 U.S.C. 154(b) by 617 days.

(21) Appl. No.: 10/671,140

(22) Filed: Sep. 25, 2003

(65) Prior Publication Data

US 2005/0070337 A1 Mar. 31, 2005

(51) Int. Cl.
*H04M 1/00* (2006.01)
*H04R 5/02* (2006.01)
*H04R 1/10* (2006.01)
*H04B 7/00* (2006.01)

(52) U.S. Cl. ..................... 455/575.2; 381/74
(58) Field of Classification Search .............. 455/569.1, 455/575.2; 381/74, 92
See application file for complete search history.

(56) References Cited

U.S. PATENT DOCUMENTS

| | | | |
|---|---|---|---|
| 4,239,936 A | 12/1980 | Sakoe | |
| 4,357,488 A | 11/1982 | Knighton et al. | |
| 4,625,083 A | 11/1986 | Poikela | |
| 4,672,674 A | 6/1987 | Clough et al. | |
| 5,381,473 A | 1/1995 | Andrea et al. | |
| 5,475,791 A | 12/1995 | Schalk et al. | |
| 5,563,952 A | 10/1996 | Mercer | |
| 5,673,325 A | 9/1997 | Andrea et al. | |
| 5,778,026 A | 7/1998 | Zak | |
| 6,230,029 B1 | 5/2001 | Hahn et al. | |
| 6,394,278 B1 | 5/2002 | Reed | |
| 6,446,042 B1 | 9/2002 | Detlef et al. | |
| 6,453,020 B1 | 9/2002 | Hughes et al. | |
| 6,757,651 B2 | 6/2004 | Vergin | |
| 7,110,800 B2 * | 9/2006 | Nagayasu et al. | 455/575.2 |
| 7,136,684 B2 * | 11/2006 | Matsuura et al. | 455/575.2 |
| 2002/0067825 A1 | 6/2002 | Baranowski et al. | |
| 2002/0068610 A1 | 6/2002 | Anvekar et al. | |
| 2002/0091518 A1 | 7/2002 | Baruch et al. | |
| 2002/0110246 A1 | 8/2002 | Gosior et al. | |
| 2002/0147016 A1 | 10/2002 | Arazi et al. | |
| 2002/0147579 A1 | 10/2002 | Kusher et al. | |

(Continued)

FOREIGN PATENT DOCUMENTS

DE 26 28 259 12/1977

(Continued)

OTHER PUBLICATIONS

International Search Report from PCT/US2004/031402 mailed Dec. 23, 2004.

(Continued)

*Primary Examiner*—William D Cumming
(74) *Attorney, Agent, or Firm*—Wood, Herron & Evans, LLP

(57) ABSTRACT

A headset for communication with a device is configured for processing audio signals captured by the headset to detect user speech and transmitting, to the device, sampled representations of the captured audio signals generally only when user speech is detected.

21 Claims, 3 Drawing Sheets

U.S. PATENT DOCUMENTS

| | | | |
|---|---|---|---|
| 2002/0152065 A1 | 10/2002 | Kopp et al. | |
| 2003/0118197 A1* | 6/2003 | Nagayasu et al. | 381/74 |
| 2003/0179888 A1 | 9/2003 | Burnett | |
| 2003/0228023 A1 | 12/2003 | Burnett et al. | |
| 2004/0213419 A1* | 10/2004 | Varma et al. | 381/92 |
| 2005/0070337 A1* | 3/2005 | Byford et al. | 455/569.1 |
| 2005/0232436 A1* | 10/2005 | Nagayasu et al. | 381/74 |

FOREIGN PATENT DOCUMENTS

| | | |
|---|---|---|
| DE | 36 04 292 | 8/1987 |
| EP | 0 380 290 | 8/1990 |
| EP | 1018854 | 7/2000 |

OTHER PUBLICATIONS

International Search Report, mailed Aug. 11, 2004.

* cited by examiner

WIRELESS HEADSET FOR USE IN SPEECH RECOGNITION ENVIRONMENT

RELATED APPLICATIONS

This application is related to the application entitled "Apparatus and Method for Detecting User Speech" by Byford, U.S. patent application 10/671,142, filed on Sep. 25, 2003, now abandoned, which application is incorporated herein by reference in its entirety.

FIELD OF THE INVENTION

This invention relates generally to mobile or portable computer terminals and headsets used in voice-driven systems having speech recognition capabilities.

BACKGROUND OF THE INVENTION

Wearable, mobile and/or portable computer terminals or devices are used for a wide variety of tasks. Such devices or terminals allow workers using them to maintain mobility, while providing the worker with desirable computing and data-processing functions. Furthermore, such terminals may provide a communication link to a larger, more centralized computer system, which further handles the organization of the tasks being performed. An overall integrated system may involve a combination of a central computer system for tracking and management of the tasks, a plurality of mobile devices or terminals and associated peripherals and the people ("users") who use the terminals and interface with the terminals and/or the computer system.

To provide an interface between the central computer system and the workers, wearable terminals and the systems to which they are connected are oftentimes voice-driven; i.e., are operated using human speech. As such, the central computer and terminals incorporate speech recognition technology. To communicate in a voice-driven system, for example, speech signals must be passed into and out of the portable devices or terminals to provide the proper speech interface with a user. Through the speech interface, the workers are able to receive voice instructions, ask questions, report the progress of their tasks, and report working conditions, such as inventory shortages, for example. Using such terminals, the work is done virtually hands-free without equipment to juggle or paperwork to carry around.

There are various ways to pass the speech signals into and out of a terminal or other device. In one scenario, a microphone and speaker located on the actual portable terminal may be used. However, such a device may not be practical in many environments. As may be appreciated, such systems are often utilized in noisy environments where the workers are exposed to various extraneous sounds that might affect the quality of their voice communication with their terminal and the central computer system. A portable terminal, mounted on a belt or other device to secure it to the user may be too far away from the user's mouth for effective communication. Therefore, more isolated or directional voice-capture techniques, such as headsets have to be utilized.

Traditional wired headsets are somewhat popular for portable terminals or devices and require a wire that extends from the headset to the terminal. A headset typically includes a microphone and one or more speakers. The terminal includes an appropriate socket for coupling with a connector or plug of the headset wire and also includes audio processing electronics for processing the speech signals sent from/to the headset. Such a traditional set-up has some drawbacks. For example, the wire from the terminal to the headset is often inconvenient as it may get caught or snagged, interrupting the work flow. Furthermore, the terminal must be configured specifically for the headset and, therefore, is limited to use with a specific headset and vice versa. Further still, if the terminal's audio processing electronics are limited, the terminal's performance will also be similarly limited as a voice-driven interface device, because the headset provides only a microphone and speakers for handling pure audio signals.

To address some of these issues, such as the headset-to-terminal wire, it is proposed to use a wireless peripheral, such as a wireless headset, to communicate with the terminal. A wireless headset (e.g., using Blue Tooth WPAN hardware) eliminates the need for a specific connector and for a headset wire. However, such a wireless system also has various drawbacks.

For example, such a headset using traditional wireless technology, such as Blue Tooth, must transmit signals continuously to the mobile terminal. This requires that substantial amounts of data be sent and the requisite transmission cycles. This has several implications. Constant transmission rapidly consumes the necessarily small battery that would be utilized in a wireless headset. Furthermore, such continuous transmission exposes a full-time user (i.e., forty hours per week) to continuous RF transmissions proximate the user's head. This may not be desirable.

In addition, using existing wireless headset technology for a voice-driven system requires that the terminal be configured to handle the significant task of all audio processing in addition to speech recognition processing. Therefore, wireless headsets would not be useful with terminals that do not have certain audio capabilities or processing power. As such, wireless headsets with current technology are not suitable in voice-driven systems that utilize speech recognition technology. Furthermore, such continuous transmission between the wireless headset and the wireless terminal is still necessary with existing systems, as putting a complete "industrial strength" speech recognizer and synthesizer into a headset is not practical.

Therefore, there is a particular need for addressing the various drawbacks in the prior art. There is a further need for achieving the benefits of a wireless headset within a voice-driven system without the full-time transmission characteristics now required. There is a need to provide wireless headset communication in a cost-effective manner that ensures proper operation of the speech recognition characteristics. The present invention provides solutions to such needs in the art and also addresses the drawbacks of various prior art solutions.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the invention.

DETAILED DESCRIPTION OF EMBODIMENTS OF THE INVENTION

Figure 1:
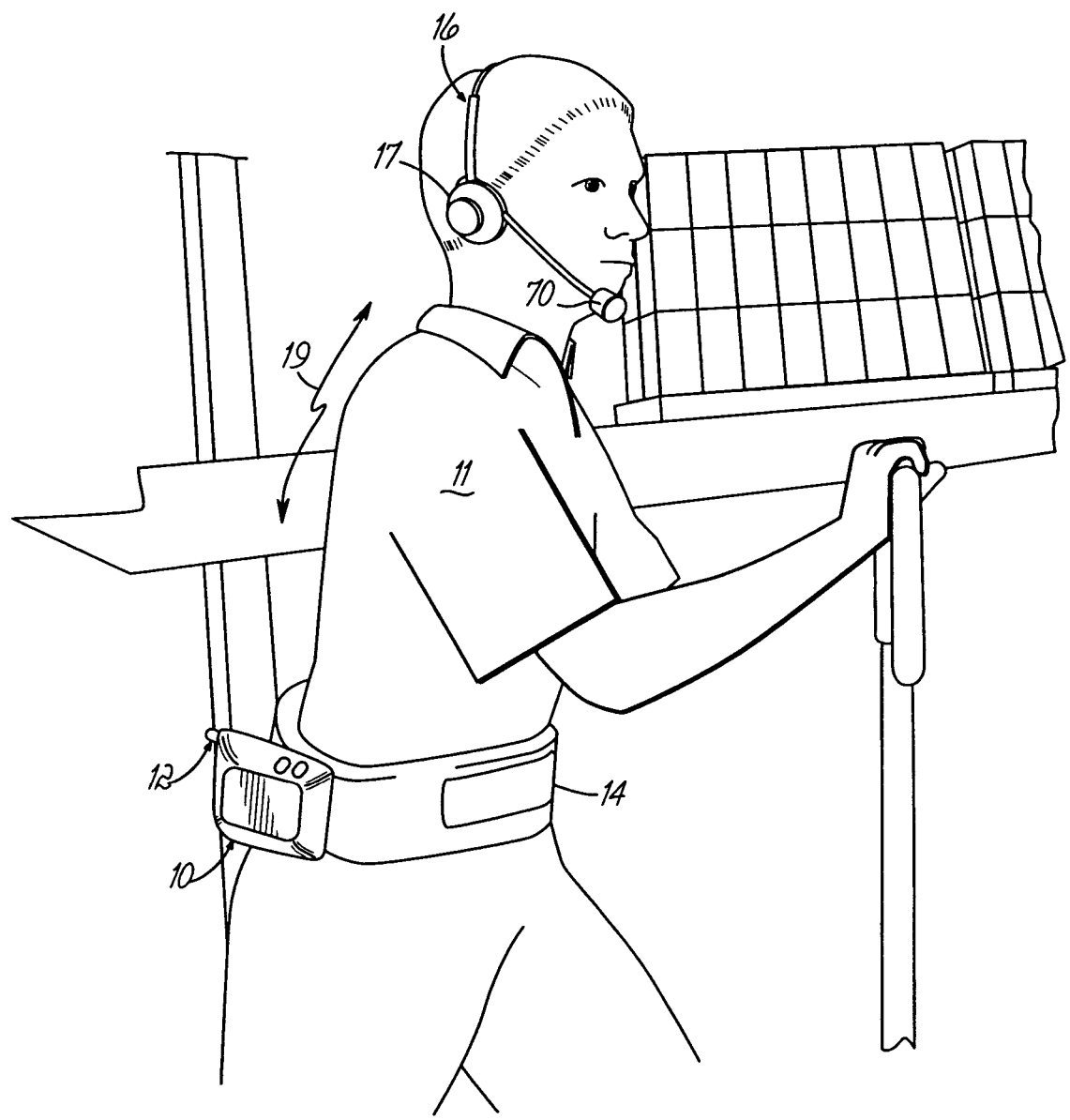
FIG. 1 is a perspective view of a worker using a terminal and headset in accordance with the present invention.

Referring to FIG. 1, there is shown, in use, an apparatus including a portable and/or wearable terminal or computer 10 and headset 16, which apparatus incorporates an embodiment of the present invention. The portable terminal may be a wearable device, which may be worn by a worker 11 or other user, such as on a belt 14 as shown. This allows hands-free use of the terminal. Of course, the terminal might also be manually carried or otherwise transported, such as on a lift truck. The wireless features of the invention allow greater flexibility with respect to the portable computer. The use of the term "terminal" herein is not limited and may include any computer, device, machine, or system which is used to perform a specific task, and which is used in conjunction with one or more peripheral devices such as the headset 16. For example, the headset may actually communicate with a central computer instead of a terminal as discussed below.

Figure 2:
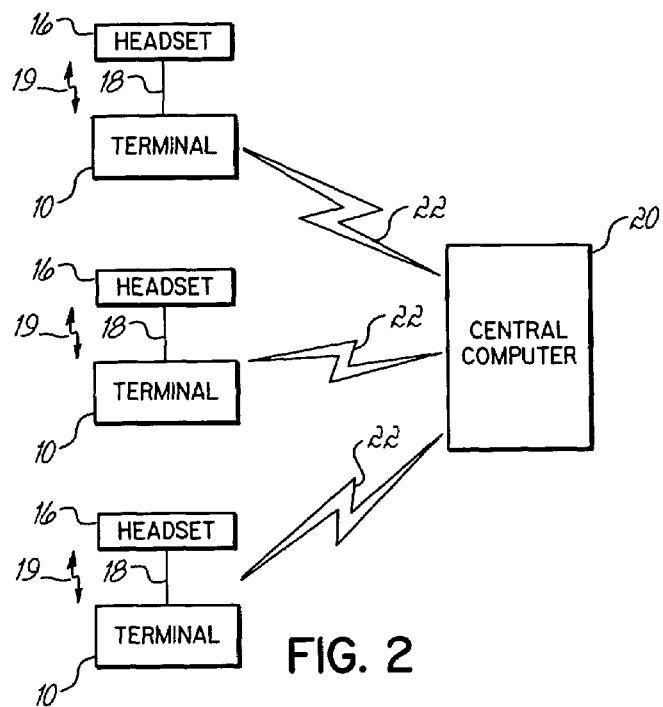
FIG. 2 is a schematic block diagram of a system incorporating the present invention.

The portable terminals 10 operate in a voice-driven system and permit a variety of workers 11 to communicate with one or more central computers (see FIG. 2), which are part of a larger system for sending and receiving information regarding the activities and tasks to be performed by the worker. The central computer 20 or computers may run one or more system software packages for handling a particular task, such as inventory and warehouse management. Of course, the terminals 10 may be stand-alone devices as well, which utilize the invention to interface with a user.

In one example embodiment, terminal 10 communicates with central computer 20 or a plurality of computers, such as with a wireless link 22. To allow the user to communicate with the system, one or more peripheral devices or peripherals, such as headsets 16, are coupled to the terminals 10. In accordance with one aspect of the invention, headset 16 is coupled to the terminal by a wireless link 19. The headset 16 is worn on the head of the user/worker and allows hands-free operation and movement throughout a warehouse or other facility.

Figure 3:
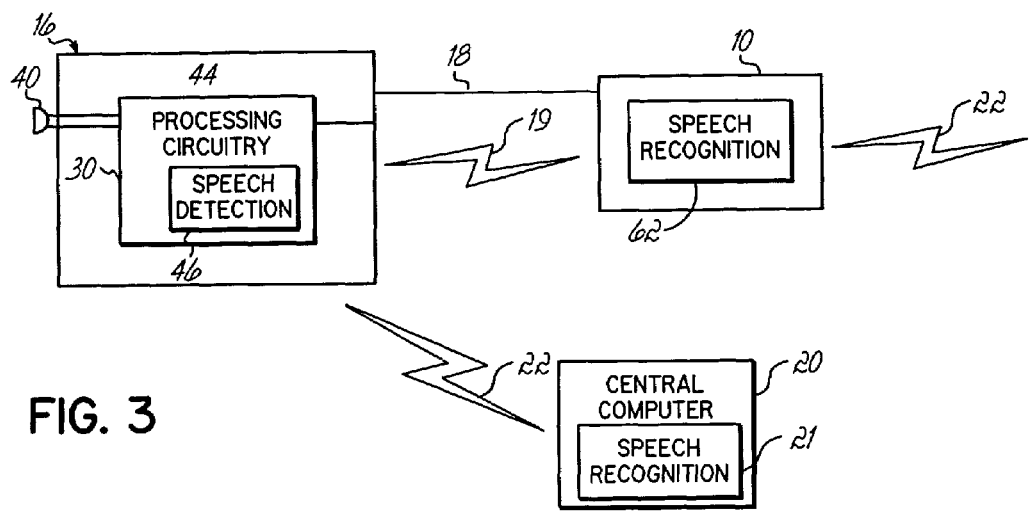
FIG. 3 is a schematic block diagram of an exemplary embodiment of the present invention.
Figure 4:
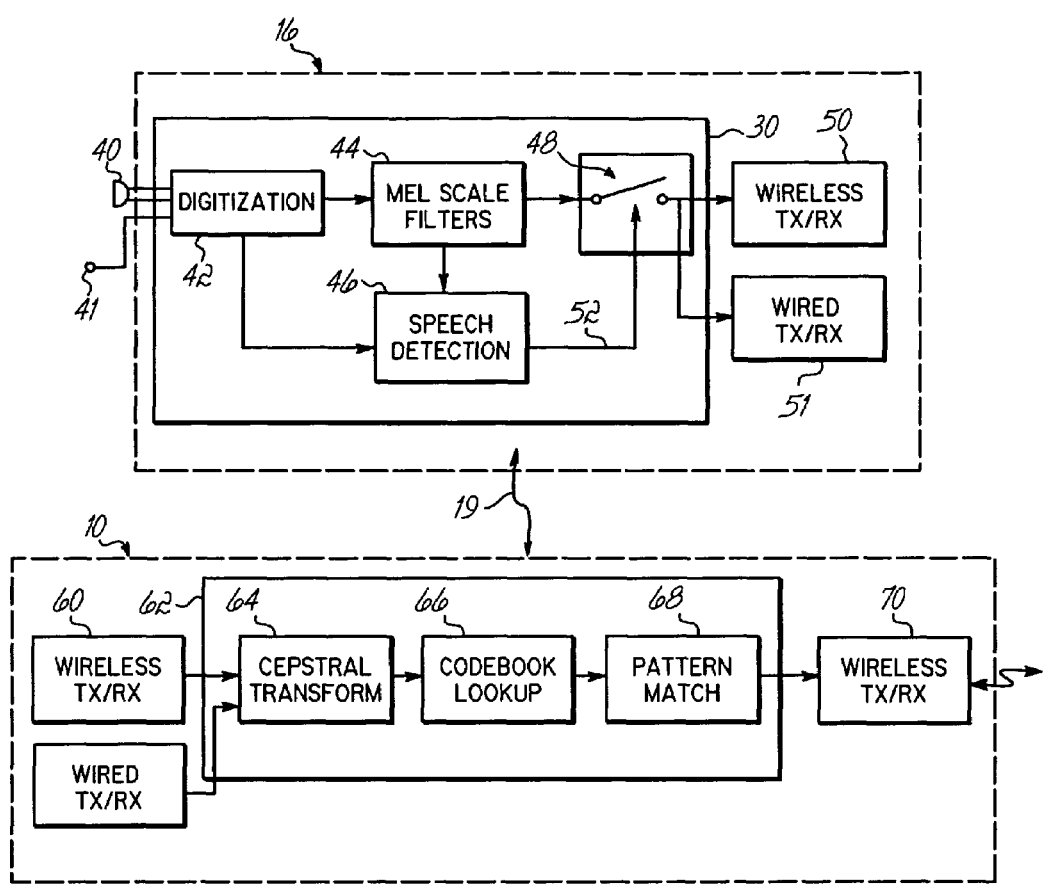
FIG. 4 is a schematic block diagram of another exemplary embodiment of the present invention.

FIGS. 3 and 4 are block diagrams of exemplary embodiments of terminals and headsets for utilizing the invention. However, the present invention is not specifically limited to the illustrated embodiments. For example, various different components or blocks will vary based upon the type of speech recognizer or speech recognition technology that may be utilized in the present invention. As such, various different speech recognizers and schemes may be utilized in the present invention without varying the segmentation of functionality between a headset and a terminal or computer as discussed further herein below. A brief explanation of the typical interaction of a headset and terminal is helpful in understanding the voice-driven environment of the invention and the specific benefits offered by the invention.

Specifically, the terminal 10 for communicating with a central computer may comprise processing circuitry, which may include a processor for controlling the operation of the terminal and other associated processing circuitry. The processing circuitry will incorporate audio processing circuits such as audio filters and correlation circuitry associated with speech recognition. One suitable terminal for implementing the present invention is the Talkman® product available from Vocollect of Pittsburgh, Pa. In accordance with one aspect of the present invention, the terminal is used in a voice-driven system, which uses speech recognition technology for communication. The headset 16 provides hands-free voice communication between the worker 11 and the terminal 10. To that end, digital information is converted to an audio format, and vice versa, to provide the speech communication between the device or system and a worker. For example, in one typical system, the terminal 10 receives digital instructions from the central computer 20 and converts those instructions to audio to be heard by a worker 11. The worker 11 then replies, in a spoken language, and the audio reply is converted to a useable digital format to be transferred back to the central computer of the system.

The present invention addresses drawbacks in the prior art by providing an enhanced headset that does more than simply capture the voice signal with a microphone and direct that pure audio signal to the terminal 10. In one embodiment, the headset and system of the present invention provide preliminary audio processing and a speech detection algorithm right at the headset for making the determination of when it is appropriate to transmit the user's speech to a terminal. Therefore, the headset is not constantly transmitting. This provides a data transmission reduction in the communication between the headset and terminal. Additional speech recognition processing is then handled by the terminal or central computer. The present invention further accomplishes transmission reduction by processing sampled representations of the audio signals and sending those to the terminal rather than pure audio. The present invention addresses various of the drawbacks of present invention wireless headsets utilizing other wireless protocols, such as Blue Tooth, and specifically addresses power consumption issues, data transmission issues, and reduces the amount of time that the headset is transmitting to the terminal or to some other device. Specifically, referring to FIG. 3, an exemplary embodiment of the present invention is illustrated. As noted above, the illustrated implementations are directed to one type of speech recognizer, such as the current Talkman® from Vocollect. However, other embodiments may utilize the present invention that utilizes speech recognition technology, without departing from the scope of the invention. The exemplary embodiments illustrated in FIGS. 3 and 4 are helpful in illustrating possible systems, utilizing a headset and a terminal and/or a computer.

FIG. 3 illustrates a simple block diagram of one exemplary embodiment of the present invention. Specifically, FIG. 3 incorporates a headset 16, which is configured to communicate in one aspect on either a wired link 18 or a wireless link 19 with a portable terminal 10. The portable terminal 10, in turn, may be configured to communicate with another link, such as wireless link 22 to a central computer 20. Alternatively, portable terminal 10 might be a stand-alone system or device that merely communicates with a user through the headset 16. In still another alternative embodiment, the headset might communicate directly on link 22 to a central computer 20.

Headset 16 incorporates a microphone device 40 configured for capturing audio signals, such as the speech of a user. In accordance with one aspect of the present invention, the headset 16 incorporates processing circuitry 30, which is configured for analyzing digitized representations of audio signals captured by the microphone 40. To that end, the processing circuitry will include suitable digitization circuitry for providing appropriate representations of the audio signals for further processing. In accordance with another aspect of the present invention, the processing circuitry 30 includes speech detection circuitry 46, which is configured to analyze the sampled representations of the audio signals to detect speech of the user. The processing circuitry 30 includes circuitry, or interfaces with circuitry, which is configured for transmission of the digitized or sampled representations to a device, such as portable terminal 10, when speech is detected. In one aspect, the circuitry transmits only when user speech is detected. In accordance with another aspect of the present invention, the circuitry generally does not transmit to the portable terminal 10 when user speech is not detected. In that way, the headset does not simply transmit continuously, but transmits when it has user speech to send.

The present invention provides several stages of data transmission reduction with respect to the communications with portable terminal 10. The term "data transmission", as utilized herein, generally refers to the amount of information that must be transferred between the headset 16 and the portable terminal 10. In prior art systems, headsets that transmit pure audio signals require transmission of all of that information and, therefore, significant data transmission to affect the communication between the headset and the terminal. The present invention provides several levels of data transmission reduction at different stages in the operation of the headset 16. In one aspect, headset 16 is configured to digitize the audio signals captured by the headset and to further process and sample the digitized signals, such as with audio filters, discussed further herein below, to provide digitized or sampled representations of those signals. When the headset 16 transmits the digitized or sampled representations, it requires significantly less data transmission than with transmission of the pure analog audio signals. Another level of transmission reduction is provided by the processing circuitry because it only transmits when user speech is detected. That is, user speech is discriminated from extraneous sounds or audio signals. Therefore, the transmission is not continuous unless the user is continuously speaking. In a typical voice-driven application, the duty cycle of user speech may be less than 10% that a user is operating the inventive system. Therefore, a significant data transmission reduction is provided, by discriminating at the headset, to transmit when speech is detected, but also generally not to transmit to a device when speech is not detected. The inventors have estimated that the invention may provide a data transmission reduction of several orders of magnitude over a traditional headset transmitting analog audio signals.

FIG. 4 illustrates a slightly more detailed exemplary embodiment of the present invention configured for a specific speech recognition system. As noted above, other speech recognition systems might be utilized with the present invention and, thus, the present invention is not limited to a specific speech recognition technology.

Referring to FIG. 4, a headset 16 incorporates at least one microphone 40 for receiving or capturing audio signals, such as the speech of a user wearing the headset. For the purposes of audio processing and further processing of such speech signals, or other signals, the signals must be digitized. To that end, processing circuitry 30 includes digitization circuitry 42, utilized to provide digitized representations of the received audio signals.

For conversion between digital and analog audio, the digitization circuitry 42 may include an audio coder/decoder chip or CODEC. One suitable audio circuit, for example, might be a UDA 1341 audio CODEC available from Philips. In accordance with one aspect of the present invention, the processing circuitry 30 further includes audio and/or speech analysis circuitry and signal processing circuitry for analyzing and further processing the digitized audio signals or speech signals. For example, headset 16 may include spectral transformation circuitry, or audio filtering circuitry, such as Mel scale filters 44, which create a spectral transform of the digitized audio signals and provide a series of sampled representations or values associated with the digitized audio signals. Mel scale circuitry, including Mel scale filters 44, are known components for audio processing and provide generally a less sampled spectral transform of the digitized speech. In accordance with the data transmission reduction aspect of the present invention, headset 16 utilizes the audio analysis and processing circuitry, such as the Mel scale filters 44, for reducing the amount of data or information sent to the terminal. In that way, power consumption is reduced, and the transmission time from the user-worn headset is also significantly reduced. That is, the audio is processed at the headset into a form which may be used by a device, but which takes less time, and therefore less power, to send to the device.

For example, in a typical headset, which seeks to transmit essentially a raw audio signal, it may require a rate of 64 kilobits for such audio transmission. However, in accordance with one aspect of the present invention, the audio processing circuitry, such as the Mel scale filters, provides a more crude, or less sampled spectral transform of the speech for transmission. This may reduce the bit rate to significantly less than one-tenth of the 64 kilobit rate. Therefore, the amount of data to be transmitted can be reduced by a factor of 10 or more, or at least one order of magnitude, while preserving the information in the signals for further speech recognition processing.

Referring to FIG. 4, the Mel scale filter bank 44 outputs sampled representations in the form of a series of frames, which are essentially a set of filter values produced by the filter bank and reflective of the spectral content of the audio signals. The Mel scale filters 44 may provide frames coming out of the filter bank, at approximately every 10 milliseconds, for example. Such audio processing and analysis in the headset provides a first stage of reduction in the amount of information (i.e., data) that must be transmitted from the headset to the terminal for the speech recognition process. As such, it provides the desired reduction in power consumption and transmission time, and it addresses other undesirable drawbacks of the prior art and prior art wireless headsets.

Headset 16 of the invention still provides audio information in a form that may be utilized efficiently by terminal 10 or computer 20 for speech recognition. By providing audio processing of the signals directly at the headset, the present invention provides another advantage over the prior art. Specifically, it reduces the processing power that is necessary in terminal 10 for speech recognition processing. In that way, less intelligent or less powerful (and therefore less expensive) devices might be utilized with the inventive headset 16 to provide speech recognition capabilities. For example, a portable device may be available but may not have the ability to properly process audio signals from the microphone. Therefore, while the portable device has suitable processing power for handling back-end speech recognition processing, it may not be able to properly do so because the quality of the digitized signal extracted from a traditional wireless headset and microphone may not be of a suitable quality for speech recognition processing. The present invention overcomes that by performing audio processing at the headset so a stream of suitably digitized information, or bits, is provided to the portable device to be handled. Such pre-processed digitized information as provided by the inventive headset is much easier to process than the raw audio signals.

In another aspect of the present invention, a wireless version of headset 16 eliminates the need for having a portable device with a suitable connector for coupling with the wire of a headset.

In accordance with another aspect of the present invention, additional benefits are obtained with further reduction in the information transmitted to the remote device or terminal. Generally, data is transmitted from the headset only when user speech has been captured by the headset. Specifically, the processing circuitry 30 in one embodiment is configured for analyzing the digitized or sampled representations of the audio signals, such as the filter value frames, to detect if the audio signals represent speech. To that end, the processing circuitry incorporates speech detection circuitry 46, which provides a detection algorithm to detect whether the audio signals represent speech from a user wearing the headset. As illustrated in FIG. 4, the digitization circuitry 42 and audio filters 44 are coupled to the speech detection circuitry. An output of the speech detection circuitry 46 is utilized to operate additional processing circuitry 48, illustrated in the form of switching circuitry, for controlling when the headset actually transmits in a wireless format to the terminal 10 or other device. Generally, in a wireless version, the headset 16 will include suitable wireless transmission or transceiver circuitry 50 for communicating with the terminal. Alternatively, the headset may include wired transceiver circuitry 51.

The speech detection circuitry 46 analyzes the filter values or "frames" from the filter circuitry 44. Various such speech detection algorithms are known and may be utilized to provide a control signal 52 for controlling the processing circuitry components 48 to determine whether the frames or some other sampled representations should be transmitted to the terminal. When user speech is detected, the processing circuitry is configured to transmit the frames or sampled representations to the terminal. Alternatively, when user speech is not detected, the processing circuitry 48 will generally not transmit the frames or sampled representations to the terminal. Of course, it is conceivable that there will be times when extraneous speech signals are detected as speech, but are not actually representative of the user speech of the headset user, and that those signals may be inadvertently transmitted to the terminal. However, in a general sense, the speech detection circuitry 46 and the processing circuitry 48 operate for primarily transmitting the sampled representations only when speech is detected. An alternative embodiment noted below discriminates extraneous noises from user speech.

As such, the processing circuitry represents an additional order of magnitude of data transmission reduction, with respect to the information transmitted to the terminal. That is, not only are those signals sent to the terminal reduced by the headset audio processing (e.g. reduced filter frames or samples) but the sampled representations will not even be sent to the terminal unless they represent user speech. Of course, such a data transmission reduction would depend upon the duty cycle of the user who is speaking into the headset. For example, if an application requires the user to talk all the time, there may be a less significant data transmission reduction provided by the speech detection circuitry 46 and processing circuitry 48 because the headset will be constantly processing and sending the speech of the user. However, the majority of applications require a user to speak only a small fraction of the time, and thus the present invention provides a significant additional reduction through the speech detection circuitry and control of when the headset actually transmits to the terminal or other remote device.

Referring now to the terminal 10 as illustrated in FIG. 3, the terminal incorporates additional circuitry 62 for the specific type of speech recognition system utilized. That is, the additional speech recognition circuitry and speech recognition processing utilized in the terminal may be any suitable speech recognition process, and generally would not affect the benefits received in the headset of the present invention that utilizes front-end audio processing circuitry to provide a reduction of the amount of information transmitted to the terminal.

The example embodiment described herein uses a headset 16 to communicate with terminal 10. Alternatively, as shown in FIG. 3, the headset may communicate directly with a central computer 20, which has appropriate speech recognition circuitry 21 therein. This bypasses a separate terminal. In the description below, the terminal 10 might also be the computer 20 or some other suitable remote device.

Referring to FIG. 4 and terminal 10, the frames that get transmitted through a link 18, 19 to the terminal are received by appropriate receiver or transceiver circuitry 61, 62 in the terminal and routed to speech recognition processing circuitry for further speech recognition processing. The processing circuitry 62 utilized will depend on the type of speech recognition system utilized within terminal 10 and within the overall system. As noted above, one suitable product for implementing the present invention is the Talkman® product by Vocollect. The speech recognition circuitry utilized therein is illustrated in FIG. 4 for the purposes of illustrating one exemplary embodiment of the invention, but certainly not limiting the invention to the type of speech recognition protocol utilized.

For example, the speech recognition processing circuitry 62 might include cepstral processing circuitry 64. The cepstral processing circuitry 64 provides a spectral transformation of the frames received from the headset 16 in accordance with known cepstral transformation principles. Additional back-end processing circuitry includes code book lookup circuitry 66 and pattern matching circuitry 68 to handle the remaining steps of speech recognition technology for the terminal 10. Primarily, cepstral processing circuitry outputs a range of values in the form of a transform that are routed to the code book lookup circuitry. The code book lookup would generate a set of code book values that are correlated with the output values of the cepstral transform circuitry 64. That is, for a particular cepstral transform of the signal, a set of code book values is output from the circuitry 66. As is well known in speech recognition technology, code book values are representative of sounds, such as words, that have a particular meaning within the operation of the overall system. The pattern matching circuitry 68 makes the determination of whether the output code values are actually indicative of a specific word that was said. For example, a set of code book values may be output that represent the word "one," or possibly the word "two." The pattern matching circuitry 68 looks at the incoming vectors, or values, from the code book lookup circuitry 66, and determines if the word "one" or "two" was spoken.

More specifically, the code book values output by the circuitry 66 are a string of values that represent the sounds that occur when a particular word is spoken. An array of those values represent a particular word. A stream of such values is generated, based upon the frames transmitted by the headset, and the stream of values is compared by the pattern matching circuitry to word sets that are in the vocabulary of the pattern matching circuitry. Upon the detection of speech through the pattern matching circuitry 68, the information might be processed further by the circuitry 62, such as in a stand-alone terminal or computer, or may be forwarded to a central computer, through an appropriate link, such as by a wireless transceiver or wireless transmitter 70 (see FIG. 2).

In the illustrated examples, some of what might be considered "front end" speech processing circuitry/hardware is positioned in the headset. However, in alternative embodiments, additional circuitry, such as the cepstral transform circuitry 64 or some of the "back end" circuitry like the codebook lookup function might also be implemented in the headset. Therefore, the present invention is not limited to the embodiments illustrated showing specific speech recognition circuitry in the headset, and different functional circuit blocks might be utilized in the headset and a remote device to provide the benefits of the invention.

In accordance with another aspect of the present invention, user speech maybe discriminated with respect to extraneous speech noises. The data is then not transmitted unless user speech is detected. To that end, headset 60 may include another microphone, such as a second microphone 41, as illustrated in FIG. 4. Outputs from the microphones are used to discriminate user speech from extraneous audio signals or sounds. The second microphone 41 is configured to capture sound and generate audio signals similar to microphone 40. However, in accordance with one aspect of the invention, microphone 41 might be positioned at a location remote or spaced away from microphone 40. Microphone 40 will generally be positioned proximate to the user's mouth to capture the user's speech. The second microphone 41 is utilized to make possible the detection of user speech in the presence of extraneous sounds, such as public address system voice sounds, on the operation of the overall system incorporating the headset 16 and the terminal 10. Specifically, each of the microphones 40, 41 is configured to generate signals that have respective signal levels. Because of its position, microphone 40 is configured to detect a greater proportion of speech sounds of a user than the second microphone will detect. However, both microphones will hear, generally equally, those extraneous non-speech noises removed from the user, such as box drops, equipment noises, or P.A. sounds. The processing circuitry 30 of the invention includes circuitry that is configured to compare signal characteristics, such as relative signal energy levels, of those signals that are generated by the two microphones 40, 41 to determine if the user is speaking. For example, with an extraneous sound, the relative difference in the signal levels at the two microphones will remain steady. However, when the user is speaking, generally the characteristics of the sounds recorded by the first, microphone 40 will change significantly with respect to the characteristics of the signals from the second microphone 41, which might be located proximate the ear or top of the head of the user, depending upon how the physical structure of the headset is implemented. This will provide an additional indication that the user is speaking. The processing circuitry 30 may further use such a feature to determine whether or not to transmit to the terminal in accordance with one aspect of the invention. Further details with respect to such a feature is recited in U.S. patent application Ser. No. 10/671,142 entitled "APPARATUS AND METHOD FOR DETECTING USER SPEECH", filed on Sep. 25, 2003 and now abandoned, filed and incorporated herein by reference in its entirety. Therefore, the processing circuitry 30, and particularly the circuitry 48, which receives the sampled frames from filters 44, provides a further level of analysis to determine when frames should be transmitted to terminal 10. As such, extraneous noise in the form of human speech, which is not user speech or speech directly from the user, might not be transmitted based upon how the headset perceives that human speech, as indicated by the characteristics of the signals from the multiple microphones 40, 41.

Accordingly, the present invention provides significant benefits and addresses various of the drawbacks of the prior art. The invention reduces the data transmission that is required to transmit necessary information from the headset to a nearby device, which performs speech recognition. The invention further makes some of the audio processing independent of the technology. Power consumption is reduced, as is exposure to a headset wearer to RF transmissions. The headset of the present invention may be utilized with speech recognition devices that do not have a specific headset connection or plug. Furthermore, the present invention provides high quality speech signal for use by a speech recognizer by providing some speech processing at the headset. Other benefits not specifically set forth are also provided by the invention.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed:

1. A system for wireless communications using speech recognition comprising:
    a device configured for processing speech signals using speech recognition circuitry, the device including at least some back end speech recognition processing circuitry;
    a headset with a microphone for capturing audio signals to be processed, the headset configured for performing front end speech recognition processing by initially forming sampled spectral transforms of the captured audio signals and processing the sampled spectral transforms of the captured audio signals using speech detection circuitry to determine that the captured audio signals include user speech as opposed to extraneous noise;
    the headset including switching circuitry that is operable to facilitate selectively wirelessly transmitting, to the device, the sampled spectral transforms of the captured audio signals when user speech rather than noise is detected from the spectral transforms and to not allow transmitting to the device when user speech is not detected;
    the back end speech recognition processing circuitry of the device using the spectral transforms transmitted by the headset to complete the speech recognition of the system.

2. The system of claim 1 wherein the headset comprises audio filter circuitry configured for forming the spectral transforms of the audio signals.

3. The system of claim 1 wherein the headset comprises circuitry for creating signal frames associated with the spectral transforms of the captured audio signals, the headset configured for transmitting the signal frames.

4. The system of claim 3 wherein the headset includes Mel scale filters for generating the signal.

5. The system of claim 1 wherein the device is a portable terminal.

6. The system of claim 1 wherein the device is a computer.

7. The system of claim 1 further comprising a second microphone, the first and second microphones configured to generate signals with the first microphone detecting a greater proportion of speech sounds of a user than the second microphone;

the headset configured to process signals generated by the first and second microphones to detect speech of the user as opposed to extraneous noise.

8. The system of claim 1 wherein the back end speech recognition circuitry comprises codebook lookup circuitry.

9. The system of claim 1 wherein the back end speech recognition circuitry further comprises pattern matching circuitry.

10. A method for wireless communication between a headset and device using speech recognition, the method comprising:
  capturing audio signals with a headset having a microphone;
  processing the captured audio signals and performing front end speech recognition by forming sampled spectral transforms of the captured audio signals at the headset and using speech detection circuitry to analyze the sampled spectral transforms to determine that the captured audio signals include user speech as opposed to extraneous noise;
  using switching circuitry for selectively wirelessly transmitting sampled spectral transforms of the captured audio signals to the device when user speech rather than noise is detected from the spectral transforms and for not transmitting to the device when user speech is not detected;
  at the device, using back end speech recognition processing circuitry of the device to process the spectral transforms transmitted by the headset to complete the speech recognition.

11. The method of claim 10 further comprising forming signal frames associated with the spectral transforms of the captured audio signals and transmitting the signal frames.

12. The method of claim 11 further comprising using Mel scale filters at the headset for generating the signal frames.

13. The method of claim 10 wherein the device is a portable terminal.

14. The method of claim 10 wherein the device is a computer.

15. The method of claim 10 further comprising capturing audio signals with a second microphone positioned in the headset, the first microphone detecting a greater proportion of speech sounds of a user than the second microphone processing the signals generated by the first and second microphones to determine if the user is speaking as opposed to extraneous noise being captured.

16. The method of claim 10 further comprising performing a spectral transformation of the sampled representations for speech recognition analysis.

17. The method of claim 16 further comprising using the spectral transformation to operate codebook lookup circuitry and to output codebook values.

18. The method of claim 17 further comprising performing pattern matching processing with the codebook values.

19. A headset for communication with a remote device for use in speech recognition, the headset comprising:
  a microphone system configured to capture audio signals including user speech; and
  front end speech recognition circuitry responsive to the output of said microphone system to form sampled spectral transforms of the captured audio signals in order to reduce the amount of microphone system output data that is communicated to said remote device;
  switching circuitry coupled with the front end speech recognition circuitry and configured to facilitate selectively transmitting the sampled spectral transforms of the audio signals to the device when user speech is detected as opposed to extraneous noise and not transmitting to the device when user speech is not detected;
  the sampled spectral transforms being in a form usable by back end speech recognition processing circuitry in the remote device to complete the speech recognition.

20. The headset of claim 19 wherein said headset communicates with said remote device wirelessly.

21. The headset of claim 19 wherein said headset includes at least two microphones positioned at different distances from the user's mouth and circuitry responsive to the outputs of said microphones and configured to process said outputs to discriminate user speech from extraneous noise.

* * * * *